US008798079B2

(12) United States Patent
Wang et al.

(10) Patent No.: US 8,798,079 B2
(45) Date of Patent: Aug. 5, 2014

(54) METHOD AND APPARATUS FOR FAST PASSING THROUGH SERVICES FOR SYNCHRONOUS DIGITAL HIERARCHY DEVICE

(75) Inventors: Xiuguo Wang, Guangdong Province (CN); Qing Wu, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 255 days.

(21) Appl. No.: 13/376,853

(22) PCT Filed: Apr. 26, 2010

(86) PCT No.: PCT/CN2010/072183
§ 371 (c)(1),
(2), (4) Date: Dec. 8, 2011

(87) PCT Pub. No.: WO2010/142169
PCT Pub. Date: Dec. 16, 2010

(65) Prior Publication Data
US 2012/0082169 A1 Apr. 5, 2012

(30) Foreign Application Priority Data
Jun. 9, 2009 (CN) .......................... 2009 1 0108006

(51) Int. Cl.
*H04L 1/22* (2006.01)
(52) U.S. Cl.
USPC .......................................... 370/400; 370/357
(58) Field of Classification Search
USPC ................................................. 370/217, 401
See application file for complete search history.

(56) References Cited

U.S. PATENT DOCUMENTS

| 6,256,292 B1 * | 7/2001 | Ellis et al. ...................... 370/227 |
| 6,658,006 B1 * | 12/2003 | Chen et al. ................. 370/395.1 |
| 6,888,791 B1 * | 5/2005 | Ellis et al. ...................... 370/227 |

(Continued)

FOREIGN PATENT DOCUMENTS

| CN | 1622516 A | 6/2005 |
| CN | 101145876 A | 3/2008 |
| CN | 101577602 A | 11/2009 |
| WO | 2004042551 A1 | 5/2004 |

OTHER PUBLICATIONS

International Search Report for PCT/CN2010/072183 dated May 25, 2010.

*Primary Examiner* — Edan Orgad
*Assistant Examiner* — Emmanuel Maglo
(74) *Attorney, Agent, or Firm* — Banner & Witcoff, Ltd.

(57) ABSTRACT

The present invention provides a method for fast passing through services in a SDH device including: a protection switching module compresses first pass-through time slots between adjacent protection ports to a second pass-through time slot; when an action of pass-through is triggered, the protection switching module sending the second pass-through time slot to a time slot configuration module to parse, and the time slot configuration module sending a parsing result to a time slot register to perform a process of a time slot pass-through. The present invention provides an apparatus for fast passing through services in a SDH device, including a protection switching module, a time slot configuration module and a time slot register. With the method and apparatus in the present invention, the processing time for the pass-through configuration is reduced obviously, which benefits to fast completion of protection switching and achieves fast recovery of ring protection network services.

12 Claims, 3 Drawing Sheets

(56) References Cited

U.S. PATENT DOCUMENTS

| | | | |
|---|---|---|---|
| 7,185,075 B1* | 2/2007 | Mishra et al. | 709/223 |
| 7,310,333 B1* | 12/2007 | Conklin et al. | 370/388 |
| 7,403,473 B1* | 7/2008 | Mehrvar et al. | 370/217 |
| 7,436,763 B1* | 10/2008 | Phelps et al. | 370/219 |
| 2003/0161352 A1* | 8/2003 | Miyamoto | 370/535 |
| 2003/0214962 A1* | 11/2003 | Allaye-Chan et al. | 370/406 |
| 2004/0107277 A1* | 6/2004 | Levesque et al. | 709/223 |
| 2008/0219152 A1* | 9/2008 | Umansky et al. | 370/222 |

* cited by examiner

METHOD AND APPARATUS FOR FAST PASSING THROUGH SERVICES FOR SYNCHRONOUS DIGITAL HIERARCHY DEVICE

TECHNICAL FIELD

The present invention relates to the field of communications, and more particularly, to a method and apparatus for fast passing through services in a synchronous digital hierarchy (SDH) device.

BACKGROUND OF THE RELATED ART

Along with the development of science and technology, communications technologies bring a lot of conveniences to human's life. A transmission network is an important component part of the overall telecommunication network and the transmission network provides transmission channels and a transmission platform for services carried in the entire network. On the other hand, due to various subjective and objective reasons, the transmission network might be interrupted because of faults, thus affecting the normal operation of transmission services and further bringing inconveniences or losses to human's work life. Moreover, since the modem society more and more depends on communications, the losses due to the fault and interrupting in the transmission network are larger and larger. Estimating according to a research, it is assumed that an optical cable of a wavelength division multiplexing (WDM) system bearing 160×10 Gbit/s is cut off, then it will cause the loss of approximately 16 million equivalent speech paths; and the communication interrupt for one hour will make an insurance company loss 20 thousand dollars, make an airline company loss 2.5 million dollars and make an investment bank loss 6 million dollars. Thus it can be seen that, the survivability of a communication network is a critical factor to be considered in design. When the services in the transmission network are interrupted, in order to reduce losses, it is necessary to minimize service recovery time as much as possible.

For a ring protection network consisting of a plurality of nodes, service data are transmitted through working channels when the ring protection network works normally. When the optical fiber between two nodes in the ring protection network is broken accidently, these two nodes switch the services in the working channel to a protection channel, and other nodes in the ring protection network pass through the protection channel so as to recover the operation of the transmission services of that ring protection network. When there is more and more multiplex section and ring protection in the SDH device, the number of the pass-through nodes becomes larger and the time for passing through also becomes longer. In addition, when the rate of optical ports composing the ring protection network becomes higher, the number of the pass-through time slots is also larger, which also increases the time for passing through with no doubt. It can be seen that reducing the time for the nodes passing through is most critical for the fast recovery of the services in the ring protection network. In the prior art, during network protection switching, a control module sends a plurality of time slots to be passed through to a time slot configuration module once, and the time slot configuration module is used to configure the plurality of time slots to achieve the time slot pass-through. However, in the time slot configuration process, the time slot configuration module needs to search or traverse the plurality of time slots, which increases the system overhead and occupies relatively long time, thus increasing the protection switching time and making against the fast recovery of services in the ring protection network.

Content of the Invention

The present invention provides a simple and feasible method and apparatus for fast passing through services to solve a technical problem that the time for passing through time slots is longer when a ring protection network of a SDH device performs protection switching.

In order to solve the above-mentioned technical problem, the present invention provides a method for fast passing through services in a SDH device, and the method comprises:

a protection switching module compresses first pass-through time slots between adjacent protection ports to a second pass-through time slot;

when an action of pass-through is triggered, the protection switching module sending the second pass-through time slot to a time slot configuration module to parse, and the time slot configuration module sending a parsing result to a time slot register to perform a process of a time slot pass-through.

Furthermore, in the above-mentioned method, before compressing the first pass-through time slots between the adjacent protection ports, the method further comprises: the protection switching module searching the first pass-through time slots between the adjacent protection ports.

Furthermore, in the above-mentioned method, the step of the protection switching module compressing the first pass-through time slots between the adjacent protection ports to the second pass-through time slot specifically comprises:

when compressing the first pass-through time slots to the second pass-through time slot, taking an input position and an output position of the first one of the first pass-through time slots as an input position and an output position of the second pass-through time slot, resetting a cross level of the second pass-through time slot, and taking the number of the first pass-through time slots to-be-compressed as a cascade number of the second pass-through time slot.

Furthermore, in the above-mentioned method, the protection switching module sending the second pass-through time slot to the time slot configuration module to parse and the time slot configuration module sending the parsing result to the time slot register to perform the process of the time slot pass-through, specifically comprises:

when the action of pass-through is triggered, the protection switching module sending the second pass-through time slot to the time slot configuration module;

after the time slot configuration module receives the second pass-through time slot, the time slot configuration module determining that the second pass-through time slot is in a compression format, and parsing the first pass-through time slots according to the cascade number of the second pass-through time slot;

the time slot configuration module sending the parsed first pass-through time slots to the time slot register to perform the process of the time slot pass-through.

Furthermore, in the above-mentioned method, said triggering the action of pass-through is: pulling out an optical fiber, initiating a protection switching control command in background or having an optical fiber fault.

The present invention also provides an apparatus for fast passing through services in a SDH device, and the apparatus comprises:

a protection switching module, adapted to search first pass-through time slots between adjacent protection ports and compress the first pass-through time slots to a second pass-through time slot;

a time slot configuration module, connected to the protection switching module and adapted to parse the second pass-through time slot to acquire the first pass-through time slots; and a time slot register, connected to the time slot configuration module and adapted to configure the second pass-through time slots parsed by the time slot configuration module, so as to fulfill a process of passing through services.

The protection switching module is further adapted to: when compressing the first pass-through time slots to the second pass-through time slot, take an input position and an output position of the first one of the first pass-through time slots as an input position and an output position of the second pass-through time slot, reset a cross level of the second pass-through time slot, and take the number of the first pass-through time slots to-be-compressed as a cascade number of the second pass-through time slot.

Said protection switching module is further adapted to, when the action of pass-through is triggered, send the second pass-through time slot to the time slot configuration module; and correspondingly, the time slot configuration module is further adapted to, after receiving the second pass-through time slot, determine that the second pass-through time slot is in a compression format, and parse the first pass-through time slots according to the cascade number of the second pass-through time slot, and send the parsed first pass-through time slots to the time slot register to perform the process of the time slot pass-through.

Said triggering the action of pass-through is: pulling out an optical fiber, initiating a protection switching control command in background or an optical fiber fault.

With the method and apparatus for fast passing through services in the SDH device in accordance with the present invention, a plurality of the first pass-through time slots between the protection ports are searched in advance and compressed to the second pass-through time slot. When the action of pass-through is triggered, it is not necessary to search or traverse the plurality of first pass-through time slots again, and the number of time slots of the second pass-through time slot acquired after the compression is relatively smaller, thus reducing the processing time of the passing through configuration largely, which benefits to fast completion of the protection switching and achieves the fast recovery of the ring protection network services.

PREFERRED EMBODIMENTS OF THE PRESENT INVENTION

The method and apparatus for fast passing through services in the SDH device in accordance with the present invention will be illustrated in combination with the accompanying drawings.

The core idea of the present invention is to find a plurality of pass-through time slots between protection ports in advance, and compress the plurality of pass-through time slots; when it is needed to perform a time slot pass-through, send the compressed pass-through time slots to a time slot configuration module to configure, so as to complete the time slot pass-through. To simplify the description, the present invention defines the plurality of pass-through time slots between the protection ports as the first pass-through time slots, and defines the compressed first pass-through time slots as the second pass-through time slot.

Figure 1:
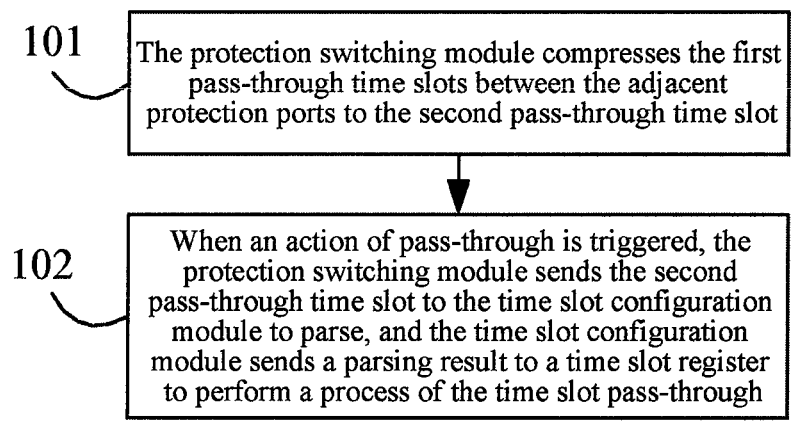
FIG. 1 is a schematic diagram of a flow chart of a method for fast passing through services in an SDH device in accordance with the present invention.

Refer to FIG. 1, FIG. 1 is a schematic diagram of a flow chart of a method for fast passing through services in a SDH device in accordance with the present invention, and the method comprises the following steps:

step 101, the protection switching module compresses the first pass-through time slots between the adjacent protection ports to the second pass-through time slot. The first pass-through time slots between the adjacent protection ports comprise time slots in two directions, i.e., a time slot from port A to port B and a time slot from the port B to the port A. After the protection switching module finds the first pass-through time slots, the protection switching module compresses the first pass-through time slots to the second pass-through time slot with a cascade method;

step 102, when an action of pass-through is triggered, the protection switching module sends the second pass-through time slot to the time slot configuration module to parse, and the time slot configuration module sends a parsing result to a time slot register to perform a process of the time slot pass-through.

Triggering the action of pass-through comprises pulling out an optical fiber, initiating a protection switching control command in background or having an optical fiber fault, and so on. The time slot configuration module, according to time slot format of the second pass-through time slot, parses information of the first pass-through time slots and sends to the time slot register to perform the time slot pass-through.

The method for fast passing through services in the SDH device in accordance with the present invention will be illustrated in detail in combination with a preferred embodiment of the present invention.

Figure 2:
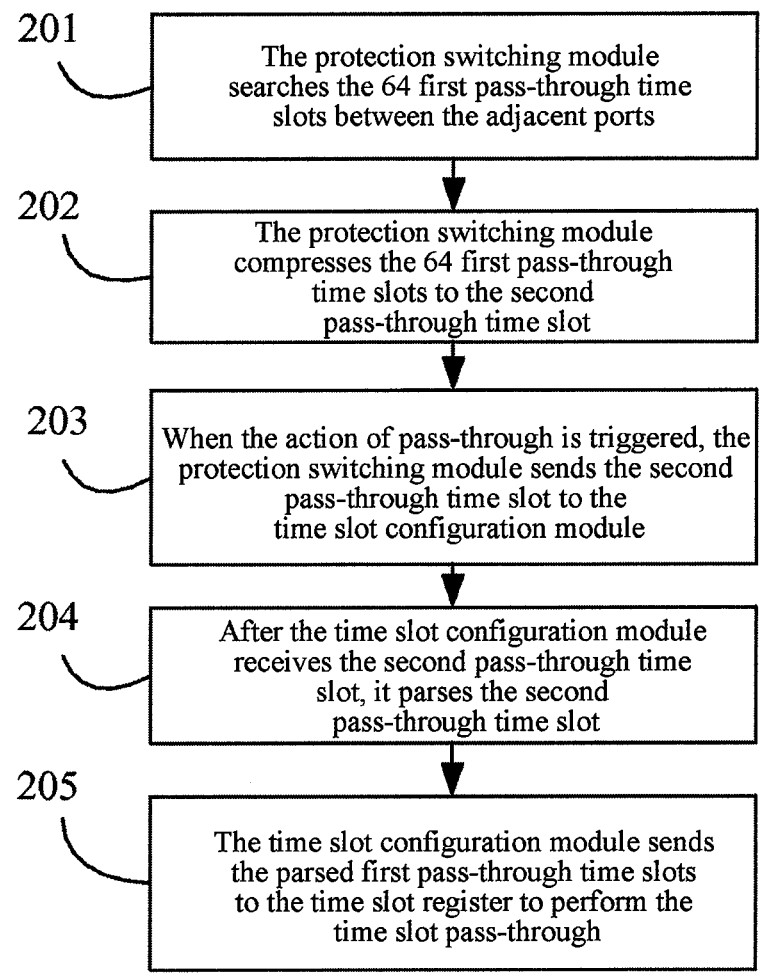
FIG. 2 is a schematic diagram of a flow chart of a preferred embodiment of a method for fast passing through services in an SDH device in accordance with the present invention.
Figure 3:
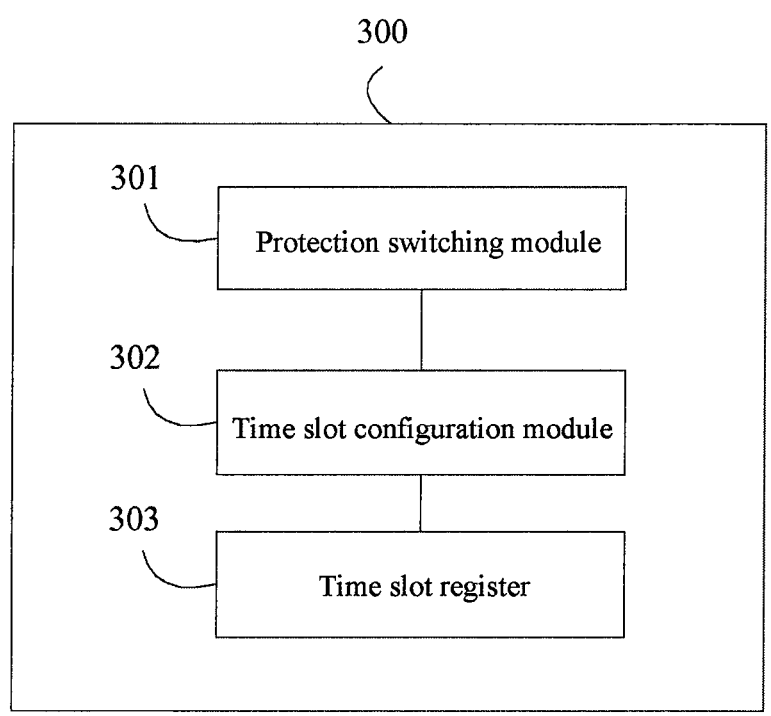
FIG. 3 is a schematic diagram of an apparatus for fast passing through services in an SDH device in accordance with the present invention.

Refer to FIG. 2, FIG. 2 is a schematic diagram of a flow chart of the preferred embodiment of the method for fast passing through services in the SDH device in accordance with the present invention. The embodiment is that the method of the present invention is applied to STM-64 optical ports in a two fiber multiplex section protection ring in the SDH device, and the method comprises the following steps.

Step 201, the protection switching module searches the 64 first pass-through time slots between the adjacent ports. Assuming that adjacent port A and port B (STM-64 optical ports) are included in the two fiber multiplex section protection ring, there are 64 administrative unit groups (AUGs) between the port A and the port B, wherein, the first 32 AUGs are working channels and the last 32 AUGs are protection channels. Therefore, there are the 32 first pass-through time slots of the protection channels that take the port A as an exit and the port B as an entry, and they are respectively:

the $33^{rd}$ AUG of the port B→the $33^{rd}$ AUG of the port A;
the $34^{th}$ AUG of the port B→the $34^{th}$ AUG of the port A;
. . .
the $64^{th}$ AUG of the port B→the $64^{th}$ AUG of the port A.

There are also the 32 first pass-through time slots that take the port B as the exit and the port A as the entry, that is, there are the 32 inverse first pass-through time slots, thus, the total number of the first pass-through time slots between the port A and the port B is 64.

Step 202, the protection switching module compresses the 64 first pass-through time slots to the second pass-through time slot.

After the protection switching module searches the first pass-through time slots between the port A and the port B, the protection switching module can compress the first pass-through time slots. The time slots have a certain format and direction, comprising an input position→an output position, a cross level and a cascade number. Generally, the cross level is used to represent the time slot type and the cascade number is used to represent the number of cascades. At present, definition of the cross level is: AU4 time slot, AU4 cascade time slot, AU3 time slot, AU3 cascade time slot, TU3 time slot, TU12 time slot and TU11 time slot. Generally, a numerical value is used to represent the cross level, i.e., AU4 time slot (1), AU4 cascade time slot (2), AU3 time slot (3), AU3 cascade time slot (4), TU3 time slot (5), TU12 time slot (6) and TU11 time slot (7). In the above-mentioned definition, the cascade number is only meaningful to the AU4 cascade time slot (2) and the AU3 cascade time slot (4) and is an invalid value (represented by 0) in other cases. Take the AU4 time slot for example, the $1^{st}$ AUG of the port 1 is the input position (represented by a), and the time slot to the $5^{th}$ AUG of the port 2 (the output position represented by b) is represented by a→b, where the cross level is 1 and the cascade number is 0.

The first pass-through time slot from the port B to the port A is represented by:

the $33^{rd}$ AUG of the port B→the $33^{rd}$ AUG of the port A, 1, 0;

the $34^{th}$ AUG of the port B→the $34^{th}$ AUG of the port A, 1, 0;

...

the $64^{th}$ AUG of the port B→the $64^{th}$ AUG of the port A, 1, 0.

The time slot compression is only effective to the same type of continuous time slots, that is, the same type of compressed time slots have the fixed increasing step length. Moreover, the pass-through time slots of the multiplex section ring protection network of the SDH device meet the above-mentioned condition, that is, the above 32 first pass-through time slots belong to the same type (they are all the AU4 time slots), and their input and output positions are continuous (increasing from the $33^{rd}$ to the $64^{th}$).

During the compression, take the input and output positions of the first one of the first pass-through time slots as the input and output positions of the second pass-through time slot, reset the cross level of second pass-through time slot after AU4 time slots compression as 8, and take the number of to-be-compressed first pass-through time slots of 32 as the cascade number of the second pass-through time slot, thus the format of the compressed second pass-through time slot is:

the $33^{rd}$ AUG of the port B→the $33^{rd}$ AUG of the port A, 8, 32;

similarly, the format of the second pass-through time slot form the port A to the port B can be represented by:

the $33^{rd}$ AUG of the port A→the $33^{rd}$ AUG of the port B, 8, 32.

Step 203, when the action of pass-through is triggered, the protection switching module sends the second pass-through time slot to the time slot configuration module.

Step 204, after the time slot configuration module receives the second pass-through time slot, the time slot configuration module parses the second pass-through time slot.

For one direction of the second pass-through time slot, the second pass-through time slot is determined as the compression format according to their cross level, and take the cascade number of the second pass-through time slot to parse out the 32 first pass-through time slots, and the input and output positions of the parsed first pass-through time slots increase from 33 to 64 by a step of 1. Meanwhile, the time slot configuration module parses out the 32 inverse first pass-through time slots, that is, the time slot configuration module acquires the information of the total 64 first pass-through time slots between the port A and the port B.

Step 205, the time slot configuration module sends the parsed first pass-through time slots to the time slot register to perform the time slot pass-through.

The time slot configuration module sends the information of the first pass-through time slots between the port A and the port B obtained by parsing to the time slot register to perform configuration, so as to complete the process of passing through services.

It should be understood that the cross level of the compressed first pass-through time slots in the embodiment can be other types, and the reset cross level of the second pass-through time slot might also be other values, the 64 first pass-through time slots between the port A and the port B can be compressed to one or two second pass-through time slots. Additionally, the first pass-through time slots between other adjacent ports can be compressed to the second pass-through time slot, that is, the method for fast passing through services in the SDH device in accordance with the present invention can also be applied to the time slot pass-through between the other adjacent ports in the multiplex section protection ring.

The present invention also provides an apparatus 300 for fast passing through services in the SDH device, and the apparatus 300 comprises: the protection switching module 301, the time slot configuration module 302 and the time slot register 303. The protection switching module 301 is used to search the first pass-through time slots between the adjacent protection ports and compress them to the second pass-through time slot; the time slot configuration module 302 is connected to the protection switching module 301 and used to parse out the first pass-through time slots from the second pass-through time slot; and the time slot register 303 is connected to the time slot configuration module 302 and used to configure the first pass-through time slots parsed out by the time slot configuration module 302, so as to fulfill the process of passing through services.

Compared with the prior art, the present invention searches the plurality of the corresponding first pass-through time slots between the protection ports in advance, and compresses the first pass-through time slots to the second pass-through time slot. When the action of pass-through is triggered, it is not necessary to search or traverse the plurality of first pass-through time slots again, and the number of time slots of the second pass-through time slot acquired after the compression is relatively smaller, thus reducing the processing time of the passing through configuration, which benefits to fast completion of the protection switching and achieves the fast recovery of the ring protection network services.

The above description is only the preferred embodiments of the present invention and is not intended to limit the present invention. For those skilled in the art, it can be understood that there may be a variety of modifications and variations in the present invention. All of modifications, equivalents and/or variations without departing from the spirit and essence of the present invention should be embodied in the scope of the present invention.

What is claimed is:

1. A method for fast passing through services in a synchronous digital hierarchy device, comprising:
   a protection switching module compressing plural first pass-through time slots between adjacent protection ports to one second pass-through time slot, wherein, the step of the protection switching module compressing the plural first pass-through time slots between the adjacent protection ports to the one second pass-through time slot comprises:

when compressing the plural first pass-through time slots to the one second pass-through time slot, taking an input position and an output position of a first one of the plural first pass-through time slots as an input position and an output position of the one second pass-through time slot, resetting a cross level of the one second pass-through time slot, and taking the number of the plural first pass-through time slots to-be-compressed as a cascade number of the one second pass-through time slot; and when an action of pass-through is triggered, the protection switching module sending the one second pass-through time slot to a time slot configuration module to parse, and the time slot configuration module sending a parsing result to a time slot register to perform a process of a time slot pass-through.

2. The method of claim 1, wherein, before compressing the plural first pass-through time slots between the adjacent protection ports, the method further comprises: the protection switching module searching the plural first pass-through time slots between the adjacent protection ports.

3. The method of claim 1, wherein, the protection switching module sending the one second pass-through time slot to the time slot configuration module to parse and the time slot configuration module sending the parsing result to the time slot register to perform the process of the time slot pass-through, comprises:

when the action of pass-through is triggered, the protection switching module sending the one second pass-through time slot to the time slot configuration module;

after the time slot configuration module receives the one second pass-through time slot, the time slot configuration module determining that the one second pass-through time slot is in a compression format, and parsing the plural first pass-through time slots according to the cascade number of the one second pass-through time slot;

the time slot configuration module sending the parsed first pass-through time slots to the time slot register to perform the process of the time slot pass-through.

4. The method of claim 1, wherein, said triggering the action of pass-through is: pulling out an optical fiber, initiating a protection switching control command in background or having an optical fiber fault.

5. The method of claim 1, wherein, said triggering the action of pass-through is: pulling out an optical fiber, initiating a protection switching control command in background or having an optical fiber fault.

6. The method of claim 2, wherein, said triggering the action of pass-through is: pulling out an optical fiber, initiating a protection switching control command in background or having an optical fiber fault.

7. The method of claim 3, wherein, said triggering the action of pass-through is: pulling out an optical fiber, initiating a protection switching control command in background or having an optical fiber fault.

8. An apparatus for fast passing through services in a synchronous digital hierarchy device, comprising:

a protection switching device, wherein the protection switching device searches first pass-through time slots between adjacent protection ports and compresses plural first pass-through time slots to one second pass-through time slot, and wherein the protection switching device, when compressing the plural first pass-through time slots to the one second pass-through time slot: takes an input position and an output position of a first one of the plural first pass-through time slots as an input position and an output position of the one second pass-through time slot, resets a cross level of the one second pass-through time slot, and takes the number of the plural first pass-through time slots to-be-compressed as a cascade number of the one second pass-through time slot;

a time slot configuration device, wherein the time slot configuration device connects to the protection switching module and parses the one second pass-through time slot to acquire the plural first pass-through time slots; and a time slot register, connected to the time slot configuration module and adapted to configure the one second pass-through time slots parsed by the time slot configuration module, so as to fulfill a process of passing through services.

9. The apparatus of claim 8, wherein, said protection switching device is further adapted to, when the action of pass-through is triggered, send the one second pass-through time slot to the time slot configuration device; and the time slot configuration device is adapted to, after receiving the one second pass-through time slot, determine that the one second pass-through time slot is in a compression format, and parse the plural first pass-through time slots according to the cascade number of the one second pass-through time slot, and send the parsed plural first pass-through time slots to the time slot register to perform the process of the time slot pass-through.

10. The apparatus of claims 8, wherein, said triggering the action of pass-through is triggered by: pulling out an optical fiber, initiating a protection switching control command in background or an optical fiber fault.

11. The apparatus of claim 8 wherein, an action of pass-through is triggered by: pulling out an optical fiber, initiating a protection switching control command in background or an optical fiber fault.

12. The apparatus of claim 9, wherein, an action of pass-through is triggered by: pulling out an optical fiber, initiating a protection switching control command in background or an optical fiber fault.

* * * * *